United States Patent [19]

Verbanets, Jr.

[11] Patent Number: 4,694,374
[45] Date of Patent: Sep. 15, 1987

[54] PROGRAMMED OVEREXCITATION PROTECTIVE RELAY AND METHOD OF OPERATING THE SAME

[75] Inventor: William R. Verbanets, Jr., Plum Boro, Pa.

[73] Assignee: Westinghouse Electric Corp., Pittsburgh, Pa.

[21] Appl. No.: 727,697

[22] Filed: Apr. 26, 1985

[51] Int. Cl.$^4$ .............................................. H02H 7/09
[52] U.S. Cl. ...................................... 361/96; 361/78; 361/91
[58] Field of Search ........................ 361/78, 79, 83, 86, 361/87, 96, 97, 102, 90, 88, 89, 91; 364/483, 484; 323/235

[56] References Cited

U.S. PATENT DOCUMENTS

| | | | |
|---|---|---|---|
| 4,245,184 | 1/1981 | Billings et al. | 323/235 |
| 4,377,833 | 3/1983 | Udren | 361/79 |
| 4,398,233 | 8/1983 | Bala et al. | 361/78 |
| 4,400,783 | 8/1983 | Locke, Jr. et al. | 364/483 |
| 4,420,805 | 12/1983 | Yamaura et al. | 361/79 X |
| 4,428,022 | 1/1984 | Engel et al. | 361/96 |
| 4,466,671 | 8/1984 | Russell, Jr. | 361/83 X |
| 4,470,091 | 9/1984 | Sun et al. | 361/86 X |

OTHER PUBLICATIONS

ASEA Specifications of V/Hz Overexcitation Relay, Type RATUB, Bearing No. B03-5011, (5/30/82).

Primary Examiner—J. R. Scott
Assistant Examiner—A. Jonathan Wysocki
Attorney, Agent, or Firm—B. R. Studebaker

[57] ABSTRACT

A programmed overexcitation protective relay with selectable time-overexcitation operation to govern the interruption of energy to a piece of power equipment, like a transformer, generator or the like. A programmed processor is included to derive an overexcitation time-to-trip in accordance with sampled measurement voltage values of at least one power line supplying energy to the power equipment being protected, and selected derivation constants stored in a memory look-up table. The derivation constants are selected from the look-up table based on derivation parameters which may be set and read by the programmed processor from time to time. The programmed processor utilizes the selected derivation constants to derive the time-to-trip over a number of predetermined time intervals during which the overexcitation condition persists.

17 Claims, 17 Drawing Figures

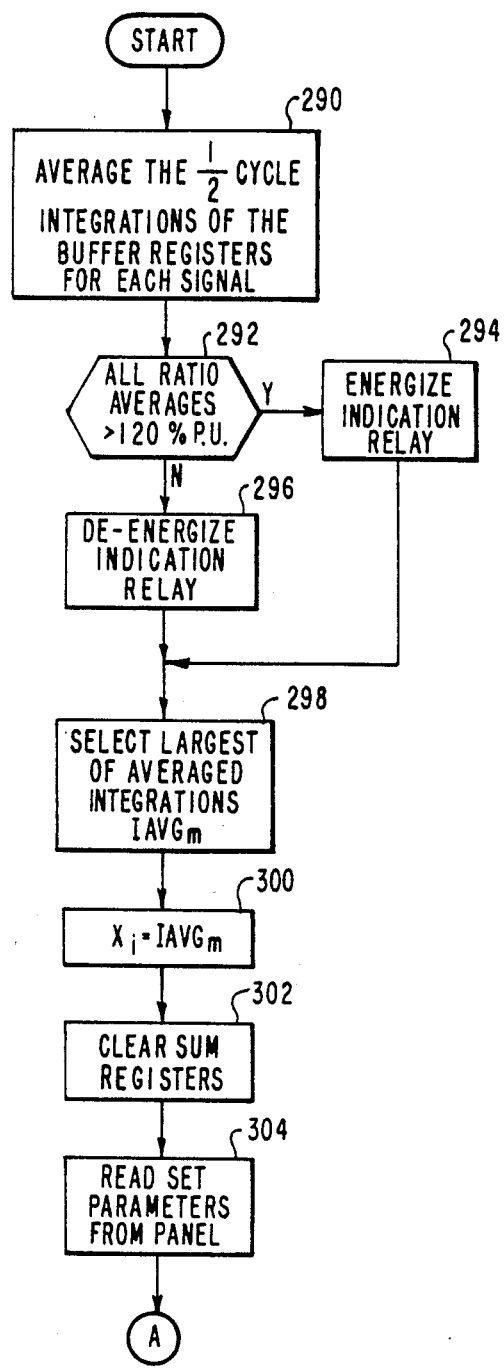
FIG.IIA

PROGRAMMED OVEREXCITATION PROTECTIVE RELAY AND METHOD OF OPERATING THE SAME

BACKGROUND OF THE INVENTION

The present invention relates to protective relays, in general, and more particularly to a programmed processor based relay for protecting power equipment from overexcitation by deriving a time-to-trip based on a selectable relationship of the ratio of voltage/hertz of the power line supplying energy to the power equipment.

Power equipment such as transformers, generators and the like incur heating primarily as the result of certain energy losses like copper loss, hysteresis loss and eddy current loss, for example. These losses can be directly linked to the flux density of the core of such equipment which is a measure of the excitation thereof. Flux density is a function of the integration of the winding voltage over time. It can be expressed on a per cycle basis as a function of the voltage divided by the frequency, hence the name of volts-per-hertz. Accordingly, an inverse-time volts-per-hertz relay is provided to protect such power equipment against overexcitation which may cause damage to the equipment in time. Some professional agencies, like the IEEE, for example, provide recommended overexcitation limit curves for several different types of power equipment, the curves generally prepared by working groups of the IEEE.

In operation, the overexcitation protective relay monitor the voltage of the power lines supplying energy to the power equipment being protected, computes the ratio of volts-to-hertz therefrom and utilize the recommended overexcitation limit curves to derive a time-to-trip for a detected overexcitation condition. Overexcitation protecting relays using inverse time characteristics recommended by the IEEE, for example, are being provided with all solid-state electronic components as exemplified by the paper presented at the Ninth Annual Western Protective Relay Conference in October, 1982 entitled "An Overexcitation Relay With Inverse Time Characteristics" authored by Jim Arthur et al. A typical solid state overexcitation relay for transformers has been specified by ASEA type RATUB bearing the Model No. B03-5011 (May 30, 1982).

More recently, a microprocessor-based overexcitation protective relay bearing Model No. M-0299 has been specified by Beckwith Electric Company, Inc. to provide protection to generators or transformers against overexcitation. Beckwith specifies that the trip time is programmable by a user as a descending curve of time versus volts-per-hertz. This inverse trip time curve is characterized by the user to a desired descending shape by entering the values of 6 points along the desired curve. The algorithm performs linear interpolation between the entered points to derive the time to trip.

SUMMARY OF THE INVENTION

A programmed protective relay protects power equipment, supplied with energy from at least one power line, against overexcitation by deriving an overexcitation time-to-trip based on a selectable relationship of the ratio of voltage/frequency of the power line. A plurality of digitally coded signals representative of predetermined derivation constants is stored in a memory which is coupled to a programmed digital signal processor. A sampler and digitizer, governed by the programmed processor, operates at first predetermined times on a signal which is representative of the measurement of voltage of the power line to digitize samples of the voltage measurement signal. A frequency cycle of the power line voltage includes a plurality of first predetermined times. The programmed processor is responsive to generated interrupts based on the frequency cycles of the power line voltage to derive first digital signals, representative of the voltage/frequency ratio of the power line, corresponding to each interrupt, from the sampled voltage measurement signals digitized over the corresponding inter-interrupt periods (i.e. the time intervals between interrupts). The programmed processor is further operative over predetermined time intervals, each including a plurality of inter-interrupt periods, to derive for each predetermined time interval a second digital signal, representative of an overall voltage/frequency ratio value $X_i$, from the first digital signals derived over the corresponding predetermined time interval i. The programmed processor is still further operative to select, at other times, certain of the digitally coded derivation constants from the memory corresponding to read derivation parameter settings associated with the other times.

In response to the detection of an overexcitation condition from the derived second digital signals, the programmed processor is operative to derive an overexcitation time-to-trip based on the following relationship:

$$\sum_{i=1}^{N} \exp\left[\frac{1}{C}(X_i - 1)\right] \geq L,$$

where i from 1 to N represent the predetermined time intervals during which said detected overexcitation condition persists; where 1/C and L represent digitally coded derivation constants based on said read parameter settings for each corresponding predetermined time interval i; where N represents the number of predetermined time intervals which may elapse for the time-to-trip beyond a minimum number of predetermined time intervals for the time-to-trip; where $X_i$ represents the second digital signal derived from the corresponding predetermined time interval i. The protective relay governs the interruption of energy to the power equipment if the overexcitation condition persists for the duration of the time-to-trip derivation.

The foregoing described inventive principals may be further applied for protecting power equipment, supplied with energy from a three phase power system including three power lines. In this embodiment, the voltages of the power lines are measured and first, second and third signals respectively representative of their voltages are sampled and digitized as governed by the programmed processor at the first predetermined times. Interrupts are generated and provided to the programmed processor based on the frequency cycles of the voltage measurement signals of the power lines. Accordingly, the program processor responds to the interrupts to derive first, second and third digital signals respectively corresponding thereto, each digital signal derived from its sampled voltage measurement signals digitized over the corresponding inter-interrupt period and representative of the voltage/frequency ratio of its voltage measurement signal for the corresponding inter-interrupt. Moreover, for each predetermined time interval which includes a plurality of inter-interrupt periods, the programmed processor derives fourth, fifth and sixth digital signals, each representative of an overall voltage/frequency ratio value $X_i$, from its respective first, second and third digital signals derived over the corresponding predetermined time interval i. The programmed processor detects an overexcitation condition from the derived fourth, fifth and sixth digital signals and derives an overexcitation time-to-trip based on the above-given expression using the fourth, fifth or sixth digital ratio value corresponding to an excitation condition.

In accordance with another aspect of the present invention, a method of operating the protective relay includes the step of operating the programmed processor in response to the detection of an overexcitation condition to derive an overexcitation time-to-trip by accumulating quantities expressed as:

$$EXP[1/C(X_i - 1)],$$

for each predetermined time interval i during the time that the overexcitation condition persists, until the value of the accumulated quantities becomes greater than or equal to L, and delaying for a fixed number of additional predetermined time intervals for which the overcurrent condition persists, where 1/C and L represent derivation constants based on the read parameter settings for each corresponding predetermined time interval i.

In one embodiment, the method includes the steps of monitoring the voltage measurement signal of a power line and generating interrupt signals at zero-crossing half-cycles thereof, operating the programmed processor in response to the interrupts to derive the first digital signals by integrating the sampled voltage measurement signals digitized over the corresponding inter-interrupt periods, and operating the programmed processor to derive each second digital signal by averaging the first digital signals derived over the corresponding predetermined time interval.

In still another embodiment, the method includes the steps of setting a voltage pick-up value, a frequency value and a pick-up adjustment value as derivation parameters, operating the programmed processor to select, at the other times, a pick-up ratio value from the memory means corresponding to the read voltage pick-up and frequency value settings associated with the other times, operating the programmed processor at the other times to adjust the corresponding selected pick-up ratio value by the read pick-up adjustment value setting associated with the other times, and operating the programmed processor to detect an overexcitation condition by determining when the derived second signal is greater than the corresponding adjusted pick-up ratio value.

In still another embodiment, the method may include the step of operating the programmed processor under non-overexcitation conditions to decrement the value of the accumulated quantity expressed above corresponding to a constant value at each predetermined time interval until either the value of the accumulated quantity reaches zero or an overexcitation condition arises.

BRIEF DESCRIPTION OF THE DRAWINGS

FIGS. 6 through 11A, 11B and 11C depict illustrative program flow charts suitable for embodying the programmed operations of the programmed processor described in connection with the embodiment of FIG. 1.

DESCRIPTION OF THE PREFERRED EMBODIMENT PROTECTIVE RELAY ARCHITECTURE

Figure 1A:
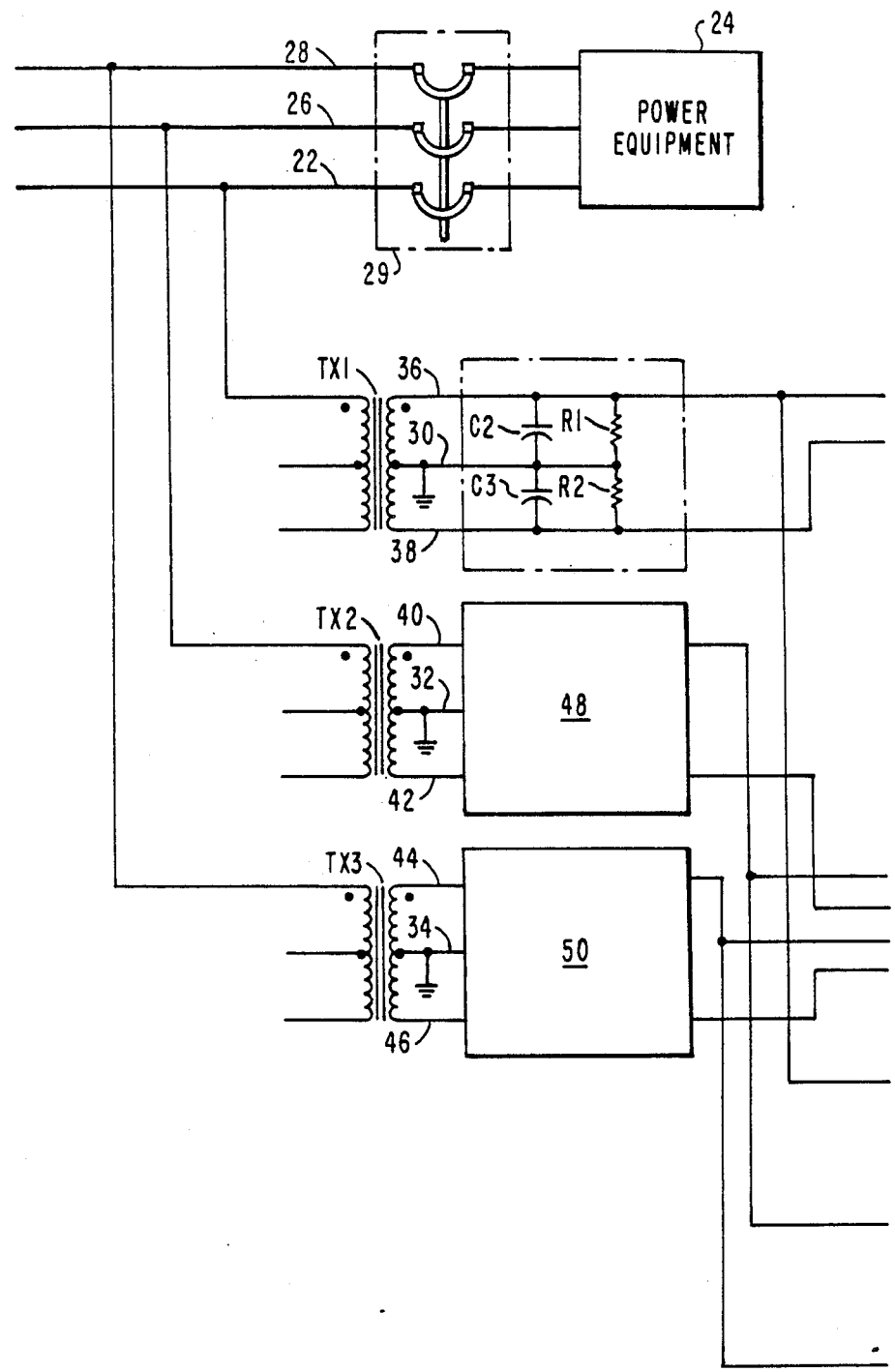
FIGS. 1A, 1B and 1C depict a block diagram schematic of a programmed processor-based protective relay suitable for embodying the principles of the present invention.
Figure 1B:
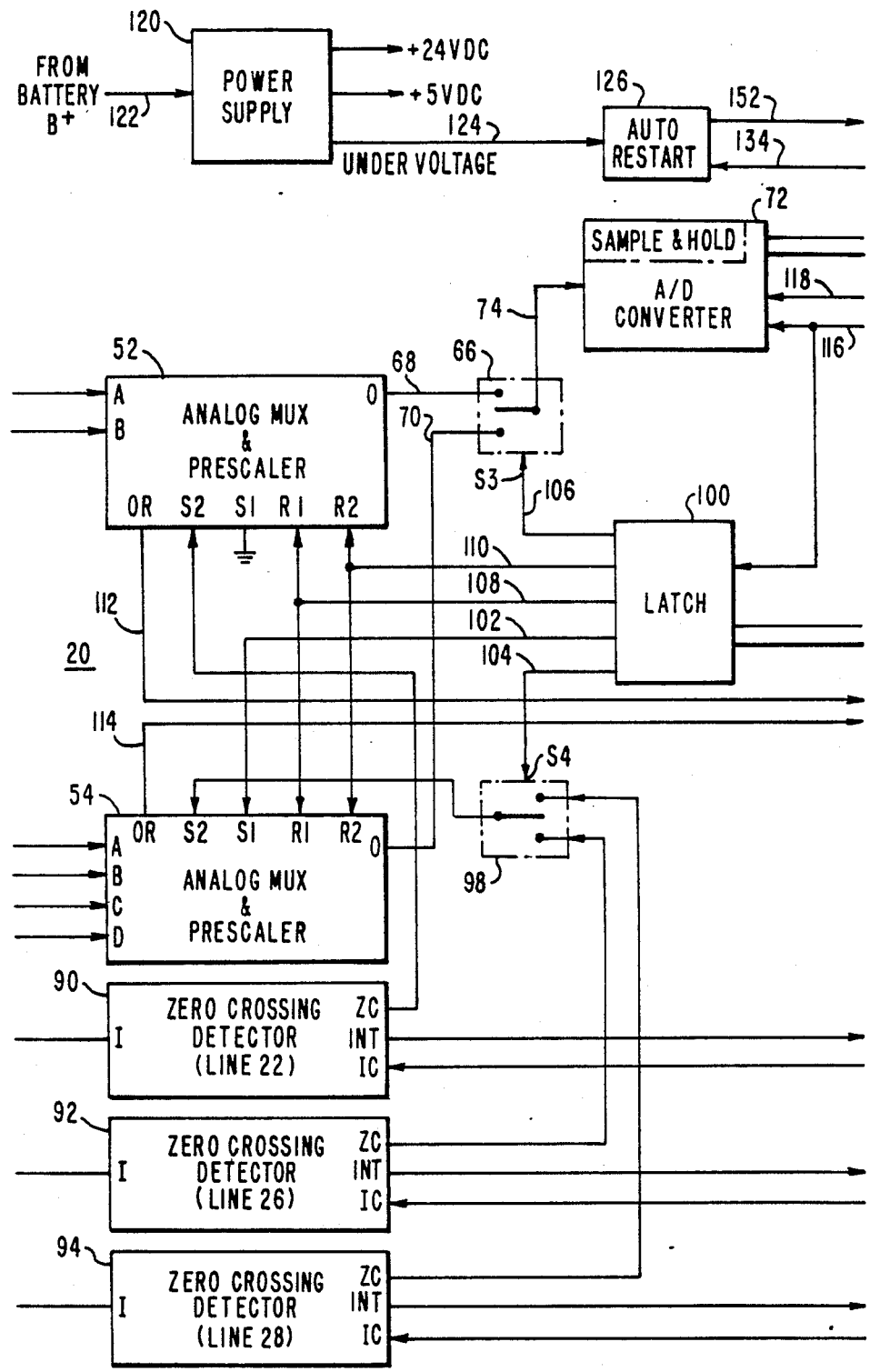
Figure 1C:
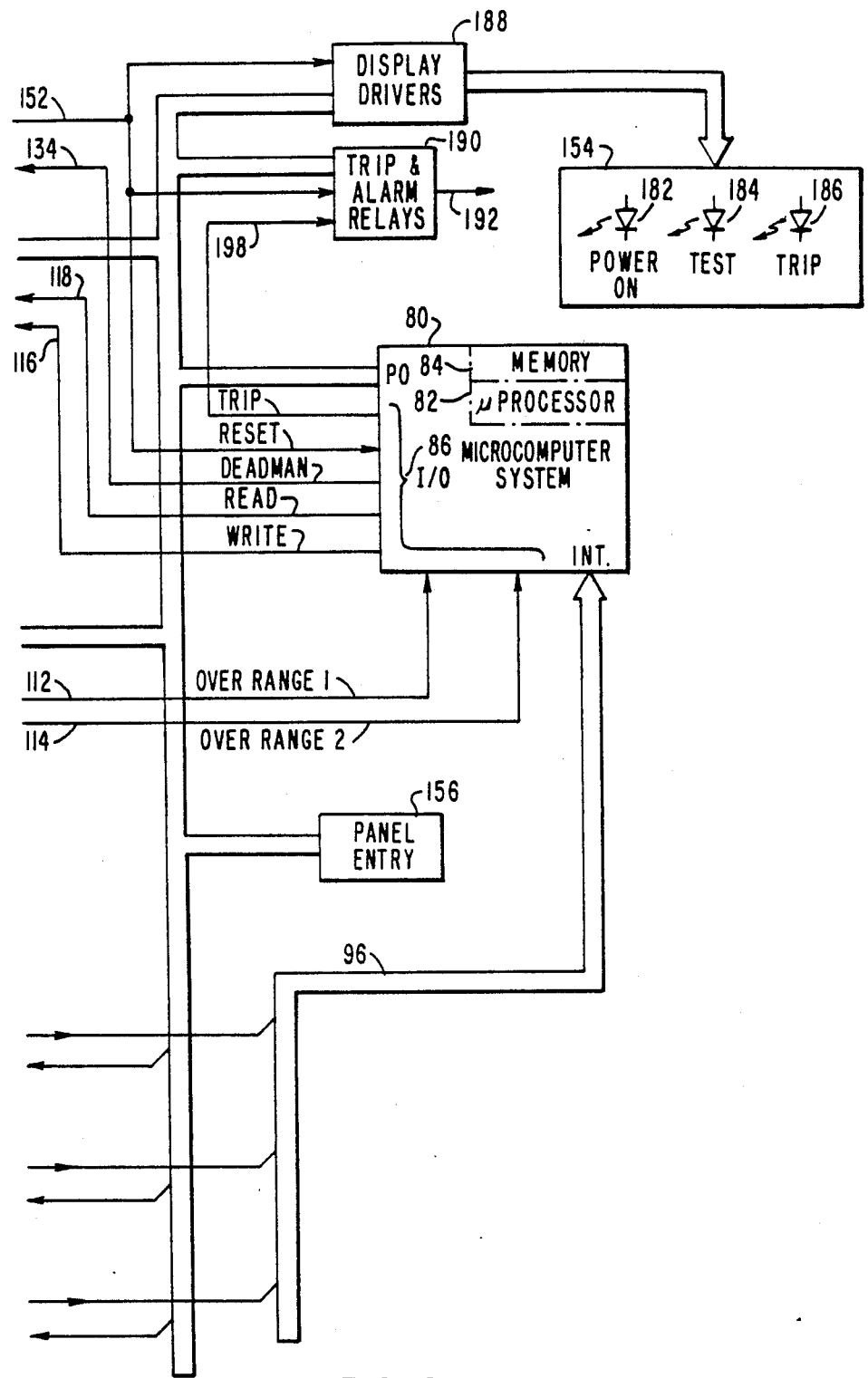

Referring to FIGS. 1A, 1B and 1C, a programmed protective relay 20 may be coupled to at least one power line 22 which is used to supply energy to a piece of power equipment depicted by the block 24, which may be a transformer, generator or like equipment. The instant embodiment depicts energy being supplied to the power equipment 24 from a 3-phase power system network over the signal lines 22, 26 and 28. The protective relay 20 is programmed to protect the power equipment 24 against overexcitation by deriving an overexcitation time-to-trip based on a selectable relationship of the ratio of voltage/frequency of at least one of the power lines 22, 26 and 28. A conventional breaker unit 29 may be disposed at the power equipment 24 and governed by the protective relay 20 to interrupt energy thereto if an overexcitation persists for the duration of the time-to-trip derivation. This programmed protective operation will become more apparent from the description provided hereinbelow.

In the instant embodiment, the primaries of a plurality of voltage transformers TX1, TX2 and TX3 are coupled respectively to the power lines 22, 26 and 28 for measuring the voltage thereof. Signals representative of the power line voltages are generated correspondingly at the secondaries of the transformers TX1, TX2 and TX3. These voltage measurement signals may be of the form of two voltage signals substantially 180° apart which is accomplished by center tapping each transformer to a common potential. Thus the voltage measurement signals which are 180° out-of-phase may be taken from either side of the corresponding transformer and measured with respect to the common center tap potential. The center taps for the transformers TX1, TX2 and TX3 are denoted in FIG. 1 as 30, 32 and 34, respectively. Moreover, the dual voltage measurement signals of the transformers TX1, TX2 and TX3 are provided over the signal lines 36, 38 and 40, 42 and 44, 46, respectively. Each of the voltage measurement signals may include a filter network comprising a parallel RC arrangement coupled between the signal line thereof and the corresponding common potential. For example, for the signal 36 a resistor R1 and capacitor C2 are coupled in parallel to the center tap 30. Similarly, for the signal 38 a resistor R2 and capacitor C3 are coupled in parallel between the signal line 38 and the center tap 30. The blocks 48 and 50 comprise similar filter circuit arrangements.

The dual voltage measurement signals 36 and 38 are coupled to two inputs of an analog multiplexor and prescaler circuit 52. In addition, the signal lines 40, 42 and 44, 46 are coupled to four inputs of another analog multiplexor and prescaler circuit 54. Each circuit 52 and 54 includes two bits of selection control S1 and S2 and two bits of ranging control R1 and R2. A suitable embodiment for an analog multiplexor and prescaler circuit is illustrated by the block diagram schematic of FIG. 3.

Figure 3:
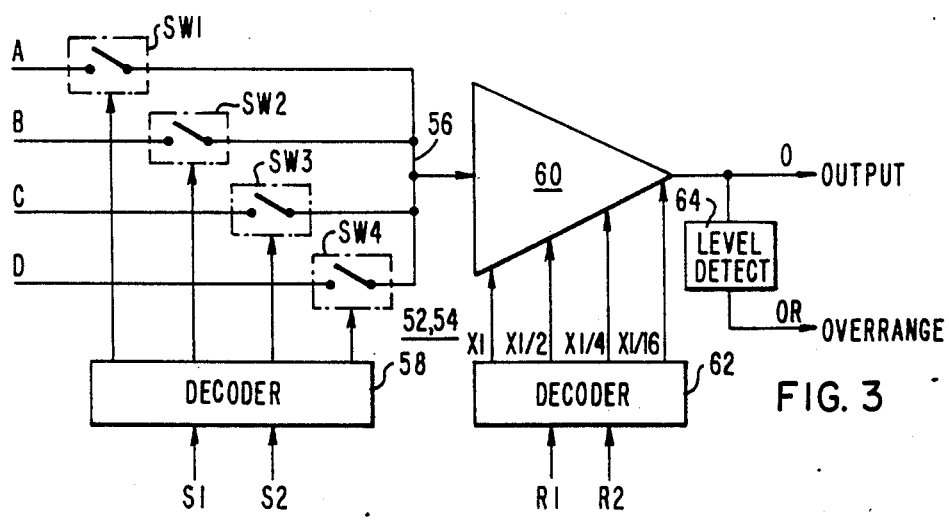
FIG. 3 is a block diagram schematic of an analog multiplexer and prescaler circuit suitable for use in the embodiment of FIG. 1.

Referring to FIG. 3, the four analog signal inputs A, B, C and D are coupled respectively to four analog switches SW1, SW2, SW3 and SW4 which have their outputs coupled to a common signal line 56. The switches SW1-SW4 are operated to pass one of the signals coupled to its inputs A-D through to the common signal line 56 in accordance with the digital code of S1 and S2 which are decoded by a conventional decoder circuit 58. The signal line 56 is coupled to the input of a gain adjusting amplifier 60, the gain of which being governed by the digital code of the signals R1 and R2. Another conventional decoder 62 provides decoded signals of R1 and R2 to the gain adjusting amplifier 60 for altering the gain thereof through gains X1, $X\frac{1}{2}$, $X\frac{1}{4}$, and X1/16, for example, to effect a gain adjusted signal at the output denoted as O. A conventional level detect circuit 64 is coupled to the output of the amplifier 60 to detect an over-range condition and provide an indication thereof over the signal line denoted as OR.

Referring back to FIG. 1B, the outputs O of the circuits 52 and 54 may be coupled to an analog selector switch 66 utilizing the signal lines 68 and 70, respectively. The pole position of the switch 66 is coupled to an analog-to-digital (A/D) converter 72 which may include a sample-and-hold circuit via signal line 74.

At the heart of the overexcitation protective relay 20 is a programmed digital signal processor 80 which for the present embodiment is a microcomputer system including the conventional elements of a microprocessor 82 which may be similar to the type manufactured by Intel Corporation having the Model No. 8031, for example, which includes an input/output section 86, a memory portion 84 which may be similar to the type manufactured by INTEL having the Model No. 2732, for example. The several units 82, 84 and 86 of the computer system 80 are conventionally coupled together through a system bus, denoted at P0, which may be used to connect the additional peripheral units to the microcomputer system 80 as will be described hereinbelow.

Figure 4:
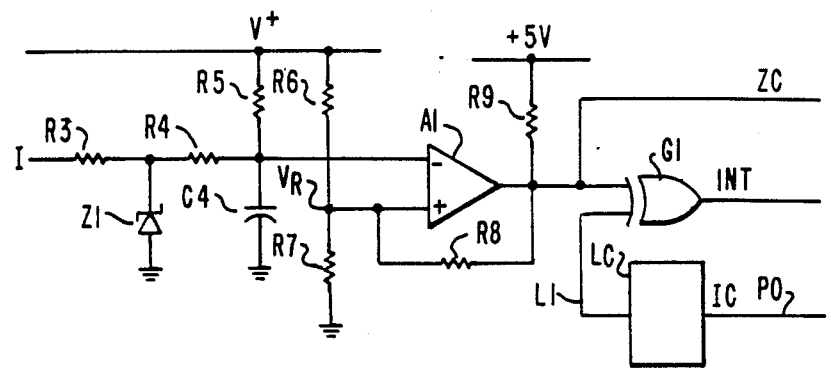
FIG. 4 is a circuit schematic diagram of a zero-crossing detector suitable for use in the embodiment of FIG. 1.

The protective relay 20 further includes three zero-crossing detector circuits 90, 92 and 94 having coupled to their inputs, denoted as I, the voltage measurement signals of lines 36, 40, and 44, respectively. A suitable embodiment for the zero-crossing detectors 90, 92 and 94 is shown by the circuit schematic of FIG. 4. Referring to FIG. 4, the monitored signal at the input I is provided to an inverting (−) input of an operational amplifier A1 through a series connection of resistors R3 and R4. At the connecting point between R3 and R4 is disposed a zener diode Z1 to ground, cathode-to-anode. Moreover, a resistor R5 is coupled between the (−) input of A1 and a voltage supply V+ for providing biasing current to the zener Z1. In addition, a capacitor C4 is coupled between the (−) input and ground or common potential for providing sufficient filtering to high frequency noise. A reference voltage $V_R$ is provided at the series connection of resistors R6 and R7 which are coupled between the supply voltage V+ and ground or common potential. The reference voltage point $V_R$ is coupled to the non-inverting (+) input of A1. A small amount of hysteresis is provided by the resistor R8 which is coupled between the (+) input and output of A1.

The output of the amplifier A1 is tied to a five volt potential through a resistor R9 and is further provided to one input of an exclusive OR gate G1. The output of A1 also becomes the ZC output of the zero-crossing detector. Moreover, selected signal lines of the system bus P0 are coupled to the IC input of the detectors for setting a logic level over the output line L1 of a latch circuit LC of the detector. The signal line L1 is coupled to another input of the exclusive OR gate G1. The output of the gate G1 becomes the output interrupt signal INT of the detector. Thus, each of the zero-crossing detectors may have a similar arrangement of circuit elements as described in connection with the embodiment of FIG. 4.

In operation, each time the voltage measurement signal at the input I crosses a zero voltage level or a voltage level substantially close thereto, the output of amplifier A1 changes the logic level between that designated as a "0" and that designated as a "1". The gate G1 provides interrupts to the microcomputer system 80 over the appropriate signal line of the signal lines 96 at the frequency half-cycles of the voltage measurement signals. In some cases the microcomputer system may be sensitive only to edge triggered interrupts in which case the gate G1 should provide an appropriate change in logic levels for each of the zero-crossing detections. In the present embodiment the microcomputer system 80 controls the logic level of L1 coupled to the comparing input of the gate G1 via the latch LC and the system bus P0. Thus, the logic level of L1 is changed after each interrupt to provide the appropriate logic level transition at the next zero-crossing.

Referring back to FIG. 1B, the zero-crossing detectors 90, 92 and 94 are utilized to exercise the switches of the analog multiplexor portions of the circuits 52 and 54 utilizing the signals S1 and S2 thereof in order to effect a rectification operation of the voltage measurement signals applied to the inputs thereof in accordance with the one-half frequency cycles of the corresponding voltage measurement signals. Thus, the same voltage measurement signal polarity is always selected for coupling through the ranging circuit portion to the A/D converter of 72. In the present embodiment, this function is accomplished by coupling the ZC output of circuit 90 to the S2 input of circuit 52 and grounding the S1 input thereof. In addition, the ZC outputs of circuits 92 and 94 are coupled to two inputs of analog switch 98 which has its pole position coupled to the signal input S2 of circuit 54. Accordingly, the S2 control of the analog multiplexor circuits 52 and 54 selects between the voltage measurement signals which are 180° apart to provide full-wave rectification for each of the voltage measurement signals of the power lines 22, 26 and 28.

The microcomputer system 80 under program control, as will become more apparent from the description of programmed operation found hereinbelow, samples and digitizes the voltage measurement signals by exercising the A/D converter 72 at a plurality of sampling times during the frequency cycles of such signals (see FIG. 1C). Furthermore, because the A/D converter 72 has a limited input signal range for which to provide corresponding digitally-coded signals to the microcomputer system 80, the ranging circuits of 52 and 54 are used to scale the selected voltage measurement signals to within this input signal range and this scaling operation is also under the program control of the microcomputer system 80. In the present embodiment, the selection and ranging operations are performed by providing certain of the system bus signals to a conventional latch circuit 100 for providing the appropriate selection and ranging signals to the various relaying units. For example, a signal is provided to S1 of circuit 54 from the latch 100 over signal line 102 to select one of the voltage measurement signals A, B or C, D which is to be provided to the output O thereof. Moreover, a signal, denoted as S4, is provided to the analog switch 98 from the latch 100 over signal line 104 to select one of the ZC output signals from the detectors 92 and 94 for governing the rectification operation of either the A,B or C,D inputs of the circuit 54. Also, a signal denoted as S3 is provided to the analog switch 66 from the latch 100 over signal line 106 to select one of the outputs of the circuits 52 and 54 for sampling and digitizing by the A/D converter 72. Thus by setting the proper code over the signals S1, S3, and S4 the desired voltage measurement signal is selected at the proper signal polarity for sampling and digitizing by the converter circuit 72.

Moreover, the ranging circuit of the selected circuit 52 or 54 is governed by providing the proper ranging code to the inputs R1 and R2 using the signal lines 108 and 110, respectively, output from the latch circuit 100. Over-range signals from the circuits 52 and 54 are provided to an I/O unit 86 of the microcomputer system 80 over signal lines 112 and 114, respectively. Still further, the sampled converted data from the converter 72 is provided to the microcomputer system over the conventional system bus P0 coupled thereto. A write signal generated from the microcomputer system 80 over signal line 116 may be used to execute the sampling and conversions in circuit 72 and the latching operations of the latch 100 and a read signal also generated from the system 80 over signal line 118 may be used to exchange data from the converter 72 to the memory of the microcomputer system 80 for storage therein.

In operation, the microcomputer system 80 conducts the appropriate codes for the signals S1, S3 and S4 over the system bus P0 to the latch circuit 100 and controls the capture thereof utilizing the write signal 116. The signals S1, S3 and S4 are conducted to their respective units over signal lines 102, 106 and 104, respectively, to govern the selection of the desired voltage measurement signal for sampling and digitizing in unit 72. After a brief delay, the microcomputer system 80 accesses the digitized information of the sampled signal over the system bus 80 utilizing the read signal 118 and stores the accessed information in the appropriate memory location of memory 84.

The protective relay 20 further includes a conventional power supply regulation circuit shown at 120 which may be supplied with energy from a station battery B+ over signal line 122. The regulator 120 provides energy to the relay 20 at various voltage potentials which may be on the order of 5 volts DC and 24 volts DC, for example. Also, in a conventional manner the power supply may determine when the desired voltage levels are in an undervoltage condition and provide an undervoltage signal over signal line 124 to an auto restart circuit 126 which interacts with the microcomputer system 80 for detecting a malfunction in the operation thereof and for restarting the programmed operation at a predetermined operational point. A suitable embodiment of an auto restart circuit is shown in the functional block diagram schematic of FIG. 5.

Figure 5:
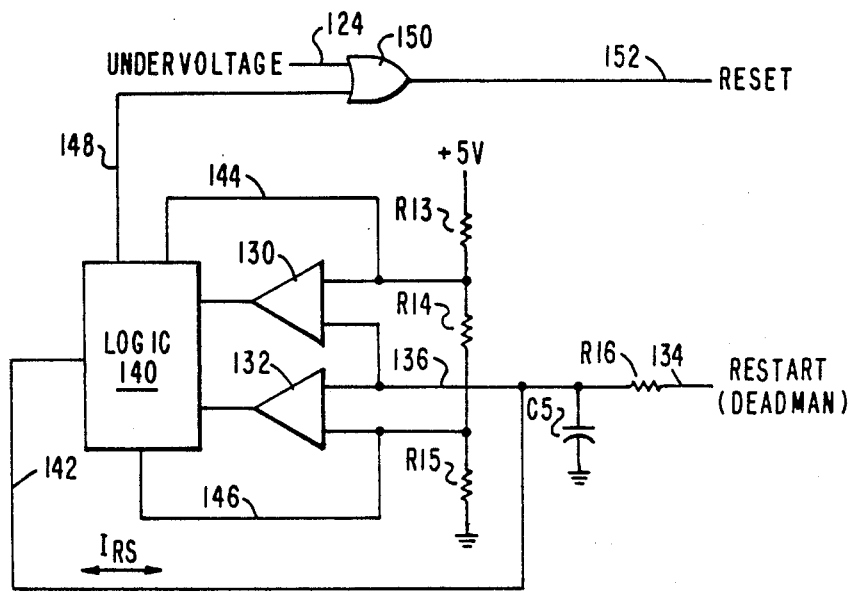
FIG. 5 is a circuit schematic diagram of an auto-restart circuit suitable for use in the embodiment of FIG. 1.

Referring to FIG. 5, two reference potentials are formed by the resistor divider network of the series connection of resistors R13, R14, and R15, coupled between the 5 volt source and common potentials. The reference potential at the connecting point at R13 and R14 is provided to one input of a comparator circuit 130 and the reference potential formed at the connection point between the resistors R14 and R15 is provided to one input of another comparator circuit 132. A restart or "dead man" signal generated periodically by the microcomputer system 80 under program control is coupled to the circuit 126 over the signal line 134 and is converted to a current by the resistor R16. The converted current signal is used to charge a capacitor C5 coupled from the resistor R16 to ground potential. The potential across the capacitor C5 is provided to the other inputs of the comparator circuits 130 and 132 over the signal line 136. The outputs of the comparator units 130 and 132 are provided to logic circuitry 140 which responds to the states thereof. From the logic circuitry 140 bidirectional current may be provided over the signal line 142 to the capacitor C5. In addition, feedback signal lines 144 and 146 are coupled between the first and second reference potential points, respectively, to the logic circuit 140. A signal line 148 is capable of carrying a reset governing signal to one input of an OR gate function 150. The other input of the OR gate 150 may be coupled to the under voltage signal 124. The generation of either the undervoltage signal 124 or reset governing signal 148 causes the OR gate 150 to generate a reset signal over signal line 152 to the I/O unit 86 of the microcomputer system 80 for resetting the programmed operation thereof to a predetermined initial point.

In operation, should the duty cycle of the "deadman" signal over signal line 134 generated by the microcomputer system 80 cause the potential across the capacitor C5 to depart beyond the window potentials of the first and second reference voltages, the outputs of one of the comparators will be caused to change state. For example, when the comparator 130 changes state, the logic unit 140 sinks current over the signal lines 142 and 144 which in turn decreases the first reference voltage to a new reference level and concurrently causes the voltage across the capacitor C5 to diminish at a rate commensurate with the current sink of signal line 142. During this time, the reset governing signal 148 causes the OR gate 196 to effect the reset signal 152 which in turn resets the program execution of the microcomputer system 80 to a predetermined initial state in a conventional manner. When the voltage across the capacitor C5 is diminished below the new reference potential, the comparator 130 reverts back to its original state terminating the current sink over signal lines 142 and 144. Concurrently therewith, the reset signal 152 is relieved allowing the program execution of the microcomputer system 80 to continue.

Similarly, when the potential across the capacitor C5 falls below the second reference potential, the comparator 132 changes state causing the logic 140 to source current over signal lines 142 and 146 which increases the second reference potential to a new reference level greater than the original second reference level and in addition, causes the voltage potential across the capacitor C5 to increase at a rate commensurate with the source current supplied thereto. Accordingly, during this time, the reset governing signal 148 is generated to effect the reset signal 152. As the voltage across C5 increases beyond the new reference potential of the comparator 132, the comparator 132 reverts to its initial state rendering cessation to source current over signal lines 142 and 146. Consistent with this condition, the second reference potential returns to its original potential level and the reset governing signal 148 is terminated, thus allowing the program execution of the microcomputer system 80 to continue.

Figure 2:
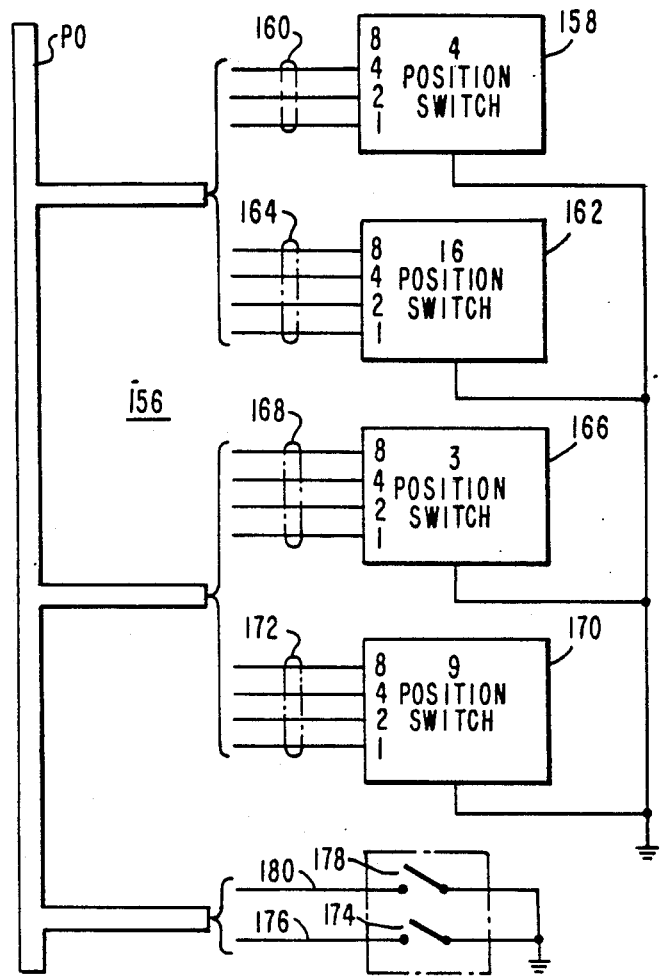
FIG. 2 is a block diagram schematic illustrating panel entry switches suitable for embodying the panel entry function used in the protective relay of FIG. 1.

The protective relay also includes a panel display portion 154 and a panel entry portion 156. In the present embodiment, the panel entry portion 156 is coupled to the microcomputer system 80 utilizing the system bus PO. A suitable embodiment for panel entry 156 is shown in the schematic diagram of FIG. 2. Referring to FIG. 2, a voltage pick-up select parameter may be set by a four position switch depicted by the block 158. The switch 158 may be a conventional rotary switch having four settable locations with each position representing a settable voltage pick-up value say 100, 110, 115, and 120 VAC, for example. A digitally coded output representing the switch set location may be provided to the system bus over signal lines 160. Another switch which may be of a 16 position rotary switch type for setting a pick-up adjust value is depicted at 162. In the present embodiment, the 16 positions of switch 162 reflect pick-up adjust settings from 105% to 120% in 1% increments. A four bit digital code representing the position setting of switch 162 is provided to the system bus over signal lines 164. The type of overexcitation protection may be set through a three position rotary switch depicted at 166 with the switch positions 0, 1, and 2 representing the overexcitation protection types of MVH-1, MVH-2, and MVH-3, respectively. A digital code representative of the selected switch position of 166 is provided over signal lines 168 to the system bus PO. Another switch depicted at 170 which may be a nine position rotary switch is used to set a K-factor associated with the MVH type and varies from 0 to 9. Digital coded signals representing the selected K-factor of the switch 170 are provided to the system bus over the signal lines 172. Another switch 174 allows frequency selection between 50 Hz and 60 Hz to be read by the system bus over a signal line 176. Still another switch 178 allows the setting of a minimum trip time between say 3 seconds and 6 seconds, for example, to be read by the system bus PO from signal line 180. The switches 158, 162, 166, 170, 174 and 178 may all be energized by the system bus and coupled commonly to a ground potential. Accordingly, each of the aforementioned switches may be set to their desired positions in order to achieve the corresponding desired overexcitation time-to-trip relationship by the programmed microcomputer based protective relay 20.

The display portion 154 of the panel may include certain indicators such as power on 182, test 184, and trip 186, for example, which may be indicated by light emitting diodes, for example. The displays 182, 184 and 186 may be operated by display drivers 188 in accordance with signals provided thereto by the microcomputer system 80 via the system bus PO and in addition, the reset signal 152. In addition, certain trip and alarm relays may be provided in the functional block 190 and may include an alarm relay, a 120% relay, a self-test relay, a trip relay, and a trip relay/reed relay, for example, Energization of the trip relay, for example, may provide a trip governing signal 192 to interrupt energy to the power equipment 24. The relays of the trip and alarm relay circuit 190 are energized in accordance with the digital signals generated by the microcomputer system 80 and provided to the circuit 190 via the system bus PO. The reset signal 152 may be provided to the relay circuit 190 to inhibit operation of the trip relay under certain conditions.

The overall operation of the overexcitation protective relay 20 as described in the foregoing paragraphs will become more fully understood from the descriptions of the theory of operation and the programmed operation found hereinbelow.

THEORY OF OPERATION

It is well known that the flux density B of the core of a transformer, generator or a like piece of power equipment, denoted as power equipment 24 in FIG. 1, is a prime measure of the excitation thereof. The flux density may be derived from Faraday's equation:

$$Nd\phi/dt = V(t) = V_p \sin(\omega t) \quad (1)$$

where N is the number of windings, $\phi$ is the core flux, and V(t) is the winding voltage being sinusoidal with $V_p$ the peak voltage and ($\omega t$) the phase angle thereof.

Equation (1) may be transformed into a flux equation as shown below:

$$\phi = \frac{V_p}{N\omega} \int_o^\pi \sin(\omega t) d(\omega t) \quad (2)$$

By dividing both sides of equation (2) by the cross-sectional area of the core, A, and integrating, an equation for flux density B is achieved:

$$B = \frac{2V_p}{AN\omega}, \quad (3)$$

and since, $\omega = 2\pi f$, equation (3) becomes:

$$B = \frac{V_p}{AN\pi f} \quad (4)$$

Now, since A, N and $\pi$ are fixed for any given piece of power equipment 24, it is recognized that $$B \alpha V_p/f \text{ (volts/hertz)} \quad (5)$$

Thus, the flux density or measure of excitation is proportional to the ratio of the voltage/frequency of the power line(s) (e.g. 22, 26, 28) providing energy to the piece of equipment 24.

The present invention utilizing a programmed signal processing or microcomputer system 80 measures the AC voltage $V_p \sin(\omega t)$ of at least one power line 22, 26 and 28 providing energy to a transformer, generator or similar power equipment 24 and computes the ratio of volts/hertz therefrom. It does this through a digital integration routine which approximates:

$$I_D = \int_o^{\pi/T} V_p \sin(\omega t) d\tau, \quad (6)$$

which, for each half-cycle of the AC voltage, may be reduced to:

$$I_D = V_p/\pi f \quad (7)$$

More specifically, in the present embodiment, samples of the AC voltage are taken by the processor 80 at predetermined sampling internals, which may be on the order of 768 μsec., for example. All of the samples taken over each half-cycle of the AC voltage are integrated by the processing unit 80 using well-known digital integration methods, like the trapezoidal, parabolic or a combination thereof, for example, to effect an integrated result being a measure of the volts/hertz excitation ratio for each half-cycle of the AC voltage. In the present embodiment, the integrated results for each half-cycle are averaged by the processing unit 80 over a predetermined internal ΔT, say on the order of 200 ms, for example. If AC voltage is being measured from more than one power line, like for all three power lines 22, 26 and 28, for example, then digital integrations are performed by the processing unit 80 concomitantly for the half-cycle periods of each and the integrated results for each power line are averaged over the predetermined interval to effect an averaged volts/hertz ratio for each power line 22, 26 and 28. One of the multiple averaged ratios, say the largest, for example, is selected for deriving the overexcitation time-to-trip by the processing system 80.

Generally, overexcitation limitations on various types of power system equipment are recommended by time inverse vs. overexcitation (volts/hertz) curve families. One example of such curves is shown in the "IEEE Guide For Abnormal-Frequency Protection For Power Generating Plants Project No. P-750" bearing report number ANSI/IEEE C37.106-198X, final draft dated Dec. 1, 1983. The aforementioned report depicts recommended overexcitation limitative curves for several different types of transformers and generators in graphs MFG-1 through MFG-6 in FIG. 11 thereof. It was recognized by the applicant that these curves may be approximated by a common relationship for deriving the overexcitation time-to-trip, t, as shown by the following equation:

$$\ln(t) = -(1/C)X + K/C, \quad (8)$$

where K and C are constants, and X is proportional to the overexcitation ratio in % having boundaries of $$1.05 \leq X \leq 1.5 \quad (9)$$

for the present embodiment.

Equation (8) may be rewritten as:

$$t = \exp(K/C) \cdot \exp(-X/C), \quad (10)$$

or $$t[\exp(X/C)] = \exp(K/C), \quad (11)$$

or $$t[\exp 1/C(X-1)] = \exp[1/C(K-1)] \quad (12)$$

Since the time-to-trip t is derived in the programmed microcomputer system 80 at discrete intervals ΔT, t may be represented as NΔT, where N is on integer and ΔT is the predetermined interval. Accordingly, NΔT may be substituted for t in equation (12) as follows:

$$N\Delta T[\exp 1/C(X-1)] = \exp[1/C(K-1)], \quad (13)$$

which may be rewritten in the form:

$$\sum_{i=1}^{N} \exp\left[\frac{1}{C}(X_i - 1)\right] = \frac{1}{\Delta T} \exp\left[\frac{1}{C}(K - 1)\right] = L. \quad (14)$$

where $X_i$ is the overexcitation ratio computed for each predetermined time interval i. Thus, when the left-hand side of equation (14) becomes greater than or equal to the right-hand side thereof as shown by the expression below:

$$\sum_{i=1}^{N} \exp\left[\frac{1}{C}(X_i - 1)\right] \geq L, \quad (15)$$

L being a constant value as a function of K and C (see equation 14), the time portion of the time-to-trip derivation beyond a minimum time-to-trip is completed. The programmed processor thereafter may delay for the minimum time-to-trip portion below generating a trip governing signal to interrupt power to the equipment being protected. In the present embodiment, the minimum time-to-trip is selectable from the panel 156 which is coupled to the processing system 80.

It should be kept in mind that the left-hand side summation or accumulation of the expression (15) is performed for the time intervals i when $X_i$ is greater than a pick-up ratio $X_{pu}$ which for the present embodiment is selected from a look-up table stored in the memory portion 84 of the processing system 80 in accordance with certain settable parameters read from the panel by the processing system, like voltage pick-up select 158 and frequency select 174 parameters, for example. Table I below exemplifies the look-up table for pick-up ratios $X_{pu}$ and includes a 98% ratio for drop-out and a 120% ratio value which may be used for setting an indicator. The ratios displayed in Table I below are digital hexidecimal codes of their numerical values.

TABLE I

| | Voltage Pick-up Select | | | | | | | |
|---|---|---|---|---|---|---|---|---|
| | 100 volts | | 110 volts | | 115 volts | | 120 volts | |
| Frequency Select | 50 Hz | 60 Hz | 50 Hz | 60 Hz | 50 Hz | 60 Hz | 50 Hz | 60 Hz |
| $X_{pu}$ | 28C2 | 21F7 | 2CD5 | 2SSC | 2EDF | 270F | 30E9 | 28C2 |
| $X_{98}$ | 27F1 | 2149 | 2BFO | 249D | 2DEE | 2647 | 2FEE | 27F1 |
| $X_{120}$ | 30E9 | 28C2 | 35CD | 2CD5 | 383F | 2EDF | 3AB1 | 30E9 |

Moreover, the pick-up ratio selected from the memory 84 may be adjusted by another settable parameter 162, read from the panel 156, which may be designated as the pick-up adjust parameter and have a range spanning from 105% to 120% settable in 1% increments, for example. The adjusted pick-up value is used to detect an overexcitation condition.

The derivation constants 1/C and L may be precalculated based on certain settable parameters, like the type of recommended limitation curve family desired, denoted as MVH−1, −2, or −3 (166), and a K factor (170) which may range from 0 to 9, for example, and stored in corresponding tables in the memory of the processing system. Tables II and III below exemplify such look-up tables and the derivation constants displayed therein are digital hexidecimal code representations of their numerical values. Thus, these derivation constants may be selected from their corresponding look-up tables based on the associated parameters set from the panel and read by the processing system.

TABLE II

| /MVH | −1 | −2 | −3 |
|---|---|---|---|
| 1/C | 20.4675 | 32.8947 | 40.9349 |

TABLE III

| K/MVH | −1 | −2 | −3 |
|---|---|---|---|
| 0 | 19C3 | 6574 | 2AF9 |
| 1 | 2AF9 | E6E4 | 7794 |
| 2 | 47AF | 20D7C | 14CBC |
| 3 | 7794 | 4ABEF | 39DDB |
| 4 | C779 | AA1CF | A1041 |
| 5 | 14CBD | 183284 | 1C0096 |
| 6 | 22B0B | 3711FB | 4DEB0B |
| 7 | 39DDF | 7D5557 | D8CFE9 |
| 8 | 60872 | 11D3E7 | 25B4B24 |
| 9 | A104D | 2893E6C | 068EB3CA |

The foregoing operational theory will become more fully understood when taken together with the descriptions of the protective relay architecture above and the programmed operation thereof found hereinbelow.

PROGRAMMED OPERATION

The programmed operation of the microcomputer system 80 will now be described in connection with the exemplary program flow charts of FIG. 6 through FIGS. 11A, 11B and 11C. The aforementioned flow charts represent a suitable embodiment for the programmed microcompter system 80 in carrying out the desired overexcitation protective relay functions of the microcomputer based protective relay 20 which was described in connection with the block diagram schematic of FIGS. 1A, 1B and 1C.

Figure 6:
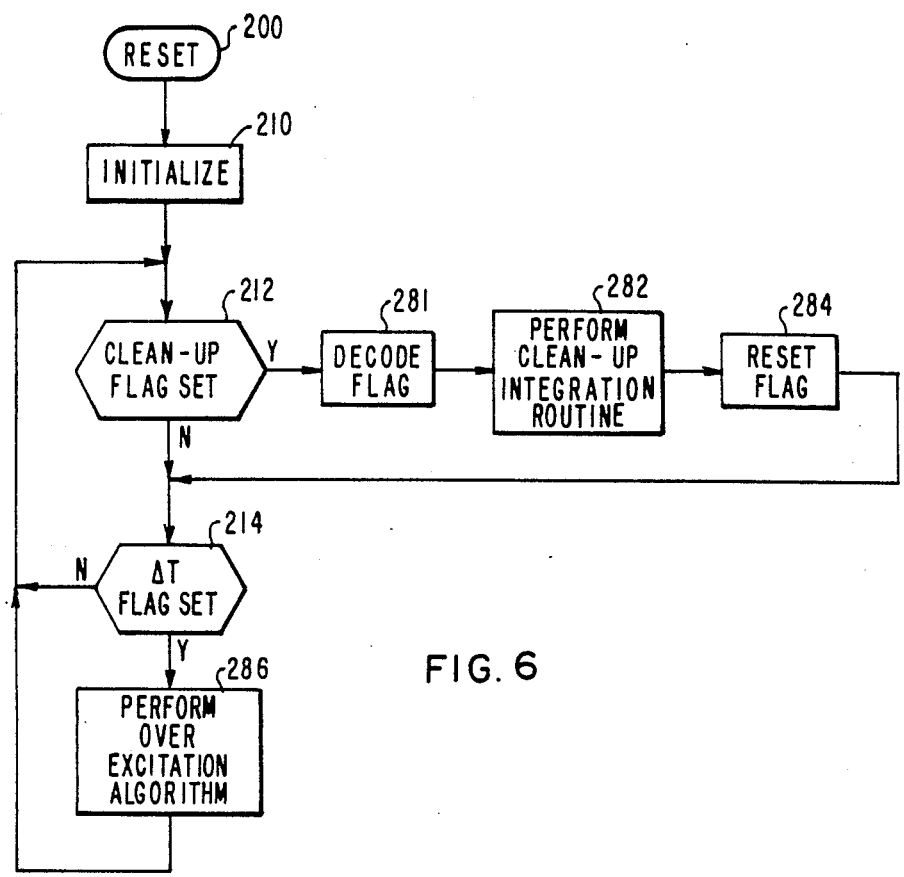
Figure 7A:
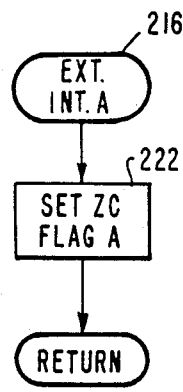
Figure 7B:
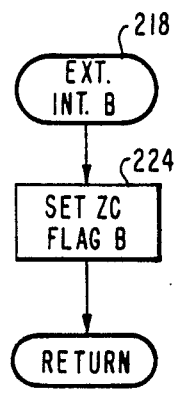
Figure 7C:
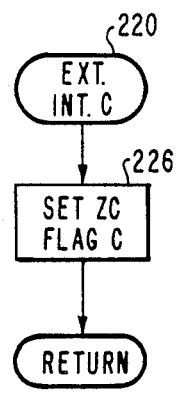

Referring to the first of the flow chart illustrations shown in FIG. 6, the reset or initial operating point of the program execution of the microcompter system 80 begins at the block 200. That is, when the reset signal 152 is generated by the auto restart circuit 126 either during an undervoltage condition or a program malfunction condition, the program execution is sustained at the reset point 200. When the reset signal is removed the program execution then continues through an initialization process which is conducted in the instructional block 210. Thereafter, the program execution cycles through two decisional blocks 212 and 214 to determine if certain flags are set during other portions of program execution which are initiated by either internal or external interrupts. For example as shown in FIGS. 7A, 7B and 7C, external interrupts arising from the detector circuits 90, 92 and 94 are provided to the microcomputer system 80 over signal lines 96 to preempt program execution and set their respectively corresponding ZC flags. In the present embodiment, the flags, A, B, and C when set represent zero-crossings detected by the circuits 90, 92 and 94, respectively. Once the appropriate flag is set, program execution is continued from its interrupt suspension state.

In addition to the external interrupts the program of FIG. 6 may be interrupted by an internal interrupt periodically, say on the order of every 256 microseconds, for example. The interrupt program execution routine associated with these internal interrupts is shown in the program flow diagram of FIG. 8. Each internal interrupt suspends execution of the background program of FIG. 6 and causes the program execution to continue at the block 230. In the present programmed embodiment, during the initialization phase 210 an initial voltage measurement signal sample was identified for conversion and properly ranged as described in connection with the embodiment of FIG. 1. Thus, the first instruction block 232 upon an internal interrupt calls for the conversion of the selected signal sample. Accordingly the digital code representation thereof is stored in an appropriate storage register in the memory 84. Thereafter, the program execution determines if one of the ZC flags are set in the decisional block 234. If a flag has been set according to an external interrupt as described in connection with FIGS. 7A, 7B and 7C, the set flag is decoded in the block 236 to determine which voltage measurement signal is to be operated on by the block 238. In 238, the integrated results of the corresponding voltage measurement signal for the instant half-cycle are transferred from their working registers into a set of buffer registers. And a clean-up flag associated with the integrated result is set in the block 240. Thereafter, the ZC flag is reset in the instructional block 242 and the exclusive OR input of the corresponding detector is set to the appropriate logic level so that an edge triggered interrupt is generated by the exclusive OR gate at the next zero-crossing detected thereby.

Program execution continues at the decisional block 244 either after execution of the block 242 or with a negative decision of the block 234. In the block 244, it is determined if the predetermined interval time ΔT has expired. If so, the ΔT flag is set in the block 246. In either case, program execution continues with the block 248 wherein a digital integration routine is performed in accordance with a conventional trapezoidal or parabolic method or a combination thereof utilizing the sampled and digitized voltage measurement signals for the present half-cycle pertaining to the instant internal interrupt. In the next block 250, the program determines which voltage measurement signal is to be sampled and digitized for the next internal interrupt and selects the appropriate measurement signal by generating the proper codes over signals S1, S3, and S4 as described in connection with the embodiment of FIG. 1. Thereafter, the gain of the ranging circuit is initialized to 1 in the block 254 by setting the proper code over the signals R1 and R2. A ranging subroutine is called in the block 256 for scaling the selected signal to within the range of the A/D converter 72. Program execution is thereafter returned to the program of FIG. 6.

Figure 8:
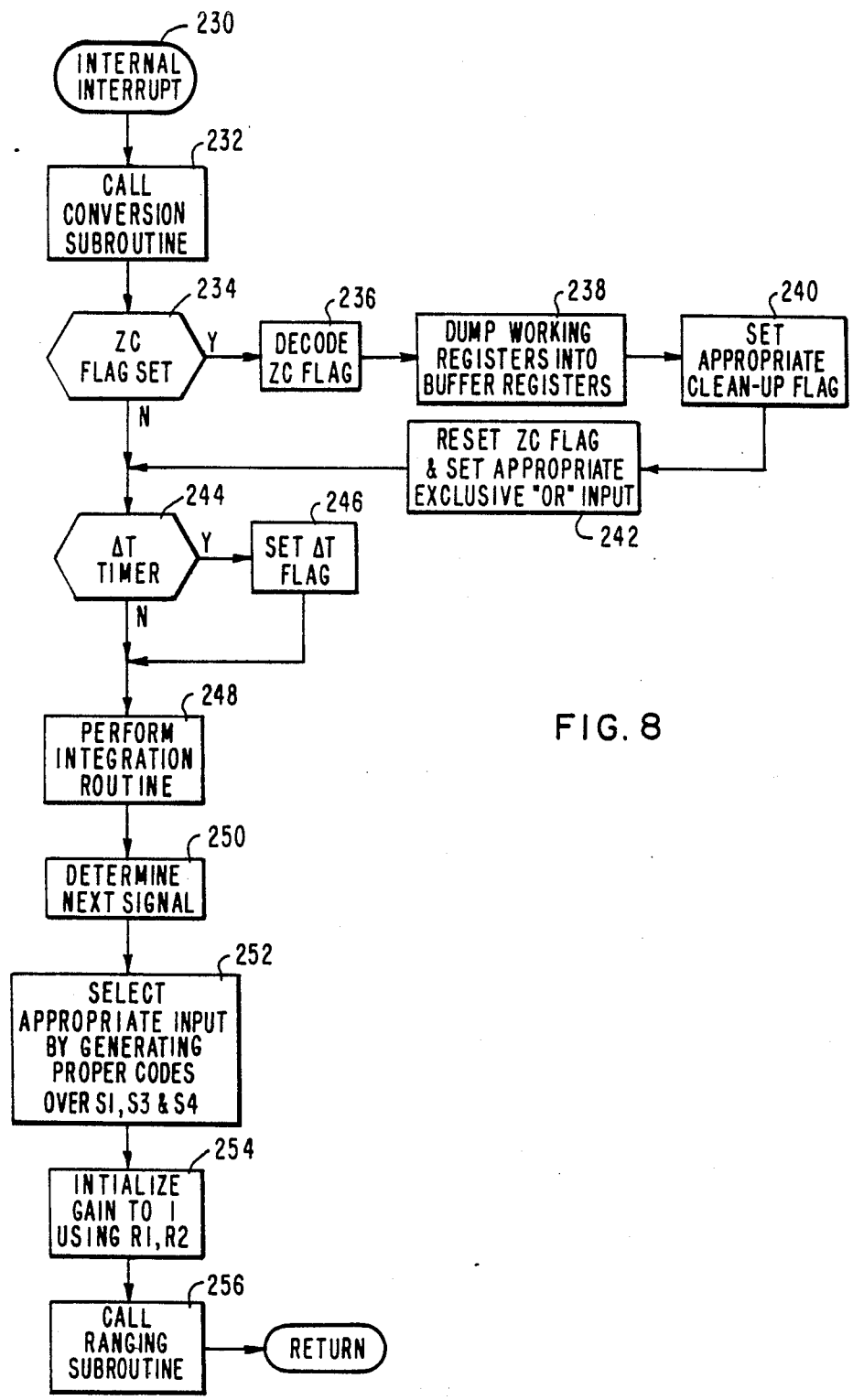
Figure 9:
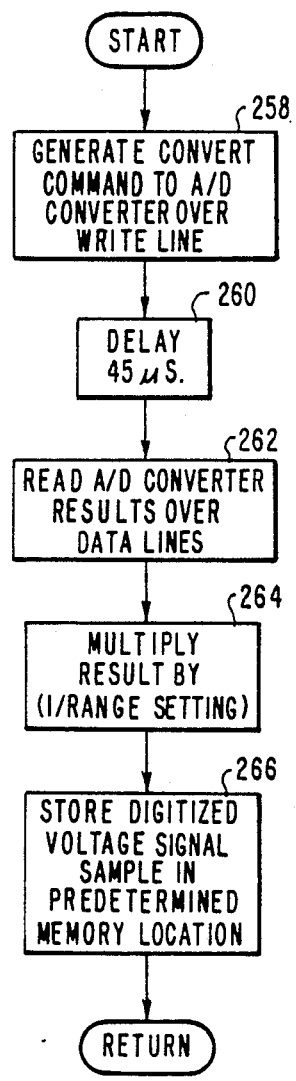

A suitable conversion subroutine for the instructional block 232 is shown in the flow chart of FIG. 9. When called the program execution starts at the block 258 wherein a convert command is generated to the A/D converter using the write signal line 116, for example. A delay of 45 microseconds or so is provided in the block 260 to allow the A/D converter time to perform its digital conversion and have its output signal lines settle to a fixed state. Thereafter, in block 262, the digitized information for the instant signal sample is read from the A/D converter 72 to the memory 84 of the microcomputer system 80 over the data line portion of the system bus PO utilizing the read signal over line 118, for example. In block 264, the information read in from the A/D converter 72 may be multiplied by a factor representing one over the range setting associated with the instant signal sample. In block 266, the resulting digitized signal sample is stored in a predetermined memory location and the program execution is returned to the decisional block 234 as shown in the flow chart of FIG. 8.

Figure 10:
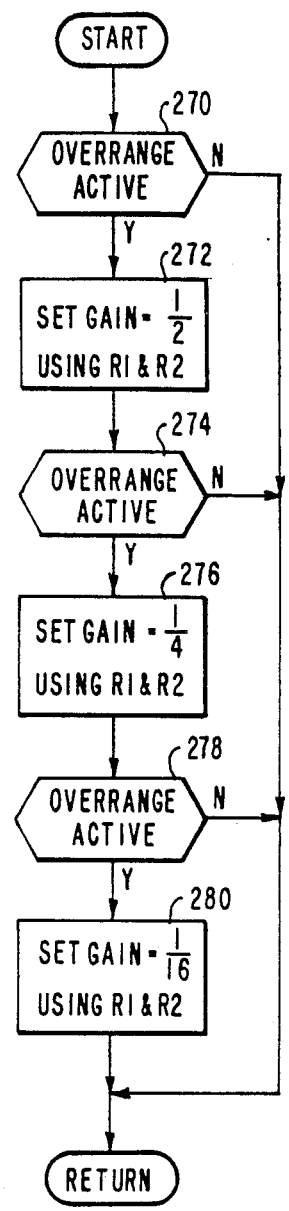

In addition, a suitable ranging subroutine embodiment for use in the flow chart of FIG. 8 at 256 is shown in the flow chart of FIG. 10. When called, the ranging subroutine starts at the decisional block 270 which determines whether the appropriate over-range signal 112 or 114 generated by the corresponding ranging circuit is active with respect to the gain setting of unit. (Refer to FIG. 3). A negative decision constitutes a proper range setting and the program execution returns to the initiating point in the program flow chart. Otherwise, the program execution continues at block 272 wherein the range gain is set to one-half using the signal lines R1 and R2 via the latch circuit 100. The appropriate over-range signal is once more sensed by the decisional block 274 and if not active the program execution returns to its initiating point. If an over-range condition persists, the program execution of the ranging subroutine continues. The range gain of the corresponding ranging circuit is changed once again to one-fourth in the block 276 and the appropriate over-range signal is checked in the decisional block 278. Depending on the over-range activity, the program execution either returns or the range gain is once more changed to 1/16th in the block 280 and thereafter returned.

Referring back to the flow chart of FIG. 6, should the clean up flag be set during the execution of the internal interrupt routine as described in connection with the flow chart of FIG. 8, then the decision of block 212 diverts the program execution to the instructional block 281 in which the instant clean-up flag is decoded to determine its corresponding voltage measurement signal. Thereafter, in block 282, a clean up integration routine is performed for the corresponding half-cycle of the instant voltage measurement signal.

A clean up integration routine is used in the present embodiment because a combination of the trapezoidal and parabolic integration methods is used for digital integration of the samples taken during the half cycle periods of the voltage measurement signals. With an even number of samples during the half cycle integration period the trapezoidal method is used for the first and last sampled intervals and the even number of sampled intervals therebetween is digitally integrated by the parabolic method. However, with an odd number of samples during a half-cycle integration period, the trapezoidal method of integration is used for the first, next to last, and last sampling intervals and the parabolic method is used for the even number of sampled intervals therebetween. Since it cannot be determined apriori how many samples will be taken in a sampling interval, some amount of corrective action is performed in the clean up integration routine if it is determined that there are an odd number of sampled intervals in a half-cycle integration period. Also, because of the asynchronism between the sampling times and the zerocrossover points of the voltage measurement signals, the first or last of the sampling intervals may not be quite equal to the other sampling intervals and must be proportioned accordingly to provide the correct digital integration result for each half-cycle. This corrective process may also be included as part of the clean up integration routine in the functional block 216.

Thereafter, the corrected integrated result for the determined voltage measurement signal of the instant half cycle period is stored in an appropriate register in the memory 84 and the corresponding clean up flag is reset in the block 284. Program execution then continues at the decisional block 214.

Moreover, should the ΔT flag be set as described in connection with the flow chart of FIG. 8, then the program execution beyond the decisional block 214 is continued at the block 286 in which an overexcitation algorithm is performed to derive the time to trip. A suitable overexcitation algorithm for use in the microcomputer system 80 of the embodiment of FIG. 1 is shown in the flow charts of FIGS. 11A, 11B and 11C.

Figure 11B:
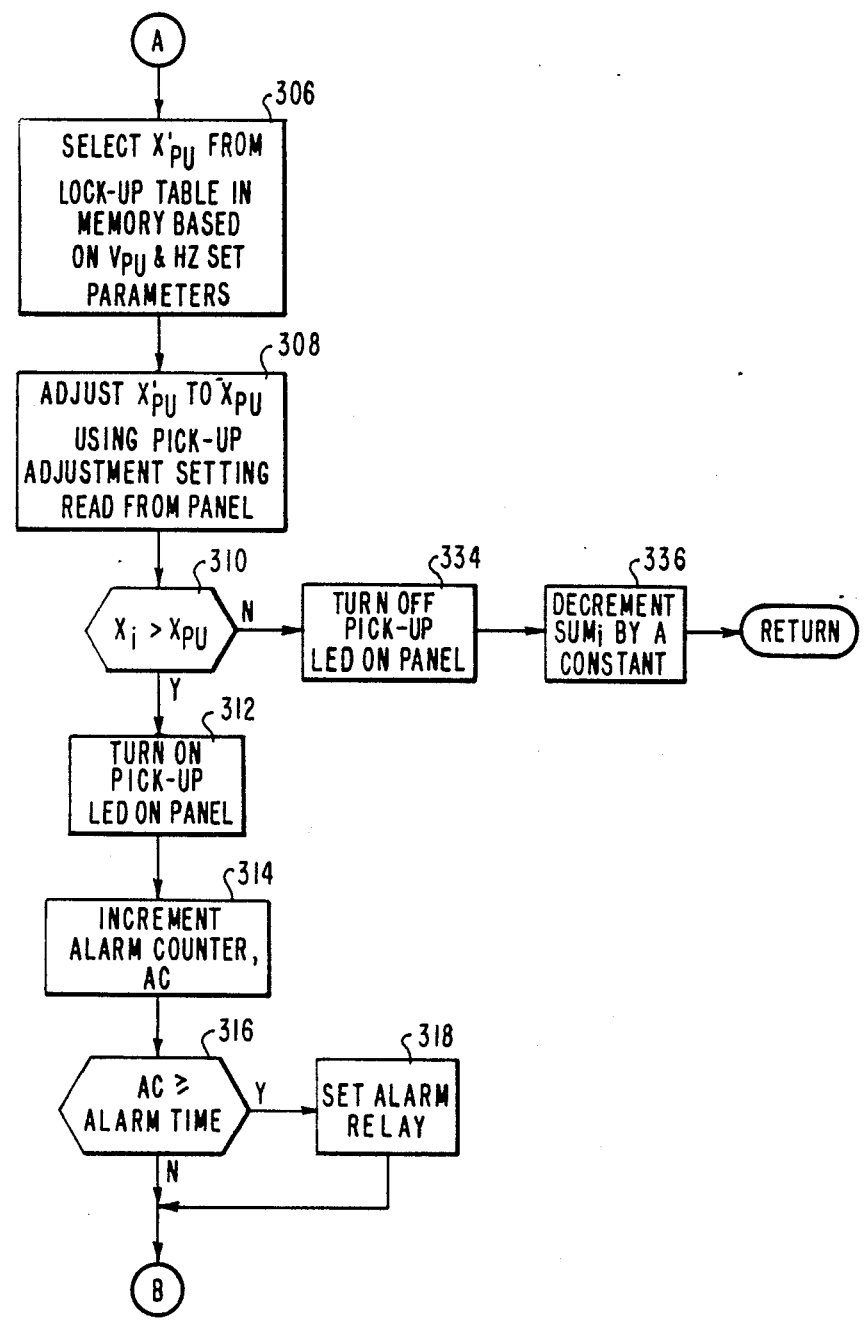

Referring to FIG. 11A, when the overexcitation algorithm is called, the program execution commences at the instructional block 290 in which the integrated results of each of the voltage measurement signals stored in buffer registers of the memory 84 for the corresponding ΔT interval are averaged to produce an averaged signal for each of the power lines 22, 26 and 28. Each of the averaged signals represent an overall voltage/frequency ratio for their corresponding power line energy sources. In the next block 292, it is determined if all of the ratio averages are greater than the 120% pick-up ratio value selected from the look-up table corresponding to table I shown hereabove. The 120% pick-up value is selected from the Table based on the voltage pick-up and frequency settable parameters found on the panel entry 156. If the determination is affirmative, an indication relay is energized in the relay circuit block 190 using block 294. Conversely, if the decision of 292 is negative, the indication relay is deenergized in block 296. In either case, program execution is continued at the block 298 in which the largest of the averaged integrations of the voltage measurement signals is selected and denoted as $IAVG_m$. Next, in block 300, a variable $X_i$ for the ΔT interval i is set equal to $IAVG_m$ and then the summing registers used to compute the averaged integrations are cleared in the block 302. Thereafter, the parameters set at the panel entry 156 are read therefrom to the microcomputer system 80 according to the instructions of block 304. Program execution then continues in the flow chart of FIG. 11B.

Referring to 11B, a pick-up ratio value $X'_{pu}$ is selected from the look-up table corresponding to Table I located in the memory 84 of the system 80 based on the set parameters of voltage pick-up and frequency select. This selection process is conducted in accordance with the instructions of the block 306 and in the next instructional block 308, the pick-up ratio value $X'_{PU}$ is adjusted to $X_{PU}$ using a pick-up adjust setting read from the panel entry 156. In the decisional block 310 it is determined if the selected computed overexcitation ratio $X_i$ is greater than the adjusted pick-up setting $X_{PU}$. If so, the pick-up LED indication on the panel portion 154 is turned on via the display drivers 188 using the instructions of block 312 and an alarm counter is incremented in block 314. Next, the accumulated contents of an alarm counter AC is tested against a predetermined alarm time to determine whether or not to set the alarm relay in the relay circuits of block 190. The setting of the relay may be accomplished in the block 318. Program execution is then continued in the flow chart of FIG. 11C.

Figure 11C:
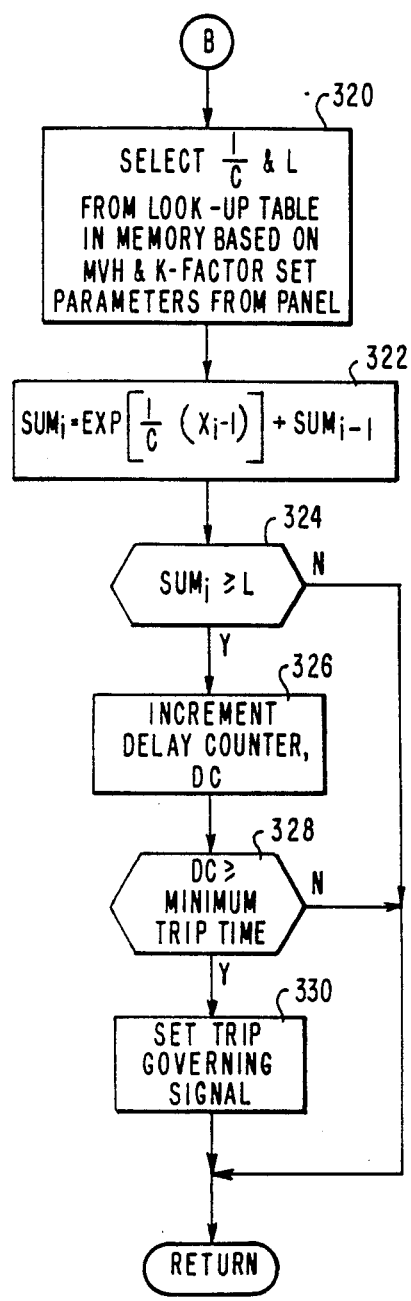

Referring to FIG. 11C, the derivation constants 1/C and L are selected from the look-up tables which correspond to the tables II and III, shown hereabove, stored in the memory 84. The selection is based on the MVH and K-factor set parameters from the panel entry 156. The foregoing operation is performed according to the instructions of the block 320. Thereafter, the calculations to compute the term EXP[1/C($X_i$−1)] for the predetermined interval i are performed in block 322 and this term is accumulated in a summing register, denoted as $SUM_i$, in accordance with the instructions of block 322. The contents of the summing register $SUM_i$ is compared with the derivation constant L in the decisional block 324. When the accumulated content of the register $SUM_i$ becomes equal to or greater than the derivation constant L, a delay counter is incremented in the instructional block 326.

Next, the contents of the delay counter DC is compared to a minimum trip time set from the panel entry 156 and read into the microcomputer system 80. This operation is conducted in the decisional block 328. If DC is not greater than or equal to the minimum trip time, program execution is returned to the flow chart of FIG. 6 to await for the next predetermined interval ΔT to elapse. Thus, as long as the accumulated contents of the register $SUM_i$ remains equal to or above the derivation constant L the delay counter continues to be incremented in block 326 for each subsequent predetermined interval ΔT until the delay counter becomes greater than or equal to the minimum trip time as determined by the decisional block 328 whereafter a trip governing signal designated at 192 in FIG. 1 is set according to the instructions of block 330. The setting of the trip governing signal 192 is an indication that the time to trip has been fully derived. Thereafter, program execution is returned to the flow chart of FIG. 6.

Returning now to the flow chart of FIG. 11B, for the situation in which the computed volts/hertz ratio $X_i$ is less than the adjusted pick-up ratio value $X_{PU}$ as determined by block 310, the pick-up indicator on the panel is turned off by the instructions of block 334 and the contents of the summing register $SUM_i$ is decremented by a predetermined constant in the block 336. Should the value of $X_i$ continue to be less than $X_{PU}$ for subsequent time intervals i the summing register will continue to be decremented in 336 by the constant until it is reduced to a zero value in which case there will be no need to further decrement this summing register $SUM_i$. The program execution may thereafter by returned to the flow chart of FIG. 6.

While the present invention has been described hereabove in connection with a preferred embodiment, there is no intention to limit the invention to such an embodiment, but rather to have it construed in breadth and scope according to the recitation of the appended claims.

What is claimed is:

1. A programmed protective relay for protecting power equipment, supplied with energy from at least one power line, against overexcitation by deriving an overexcitation time-to-trip based on a selectable relationship of the ratio of voltage/frequency of an energy supplying power line, said protective relay comprising:

a programmed digital signal processor;

memory means, coupled to said programmed processor, for storing a plurality of digitally coded signals representative of predetermined derivation constants;

means for setting a plurality of derivation parameters;

means for measuring the voltge of an energy suplying power line and generating at least one signal representative thereof;

means governed by said programmed processor to sample said voltage measurement signal at first predetermined times and to digitize said sampled voltage measurement signals, a frequency cycle of a power line voltage including a plurality of first predetermined times;

means for generating interrupts to said programmed processor based on the voltage frequency cycles of said voltage measurement signal;

said programmed processor responsive to said generated interrupts to derive first digital signals, representative of the voltage/frequency ratio of said voltage measurement signal, corresponding to each interrupt, from the sampled voltage measurement signals digitized over the corresponding inter-interrupt periods;

said programmed processor operative over predetermined time intervals, each including a plurality of inter-interrupt periods, to derive for each predetermined time interval a second digital signal, representative of an overall voltage/frequency ratio value $X_1$, from the first digital signals derived over the corresponding predetermined time interval i;

said programmed processor operative at times corresponding to said predetermined time intervals to read said parameter settings;

said programmed processor operative to select, at other times, certain of said digitally coded derivation constants from said memory means corresponding to said read parameter settings associated with said other times;

said programmed processor operative to detect an overexcitation condition from said derived second digital signals;

said programmed processor operative, in response to the detection of an overexcitation condition, to derive an overexcitation time-to-trip based on the following relationship:

$$\sum_{i=1}^{N} \exp\left[\frac{1}{C}(X_i - 1)\right] \geq L,$$

where i from 1 to N represent the predetermined time intervals during which said detected overexcitation condition persists;

where 1/C and L represent digitally coded derivation constants based on said read parameter settings for each corresponding predetermined time interval i;

where N represents the number of predetermined time intervals which may elapse for the time-to-trip beyond a minimum number of predetermined time intervals for the time-to-trip;

where $X_1$ represents the second digital signal derived from the corresponding predetermined time interval i; and means for governing the interruption of energy to said power equipment if said overexcitation condition persists for the duration of said time-to-trip derivation.

2. The protective relay in accordance with claim 1 wherein the sampling and digitizing means includes an analog-to-digital converter having a limited input signal range for which to provide corresponding digitally-coded signals; and a ranging circuit for scaling the voltage measurement signal to within the input signal range of said analog-to-digital converter, both said analog-to-digital converter and said ranging circuit being operatively governed by said programmed processor at the first predetermined times.

3. The protective relay in accordance with claim 2 wherein the ranging circuit includes a plurality of range settings selectable for scaling the voltage measurement, and means for detecting when said scaled signal is beyond the input signal range of the analog-to-digital converter and for generating an over-range signal indicative thereof; and wherein the programmed processor is operative to monitor said over-range signal and to select a range setting by governing a sequencing through said plurality of range settings from the highest to the lowest based on said monitored over-range signal.

4. The protective relay in accordance with claim 2 wherein the measuring means includes means for generating two voltage measurement signals substantially 180° apart; and including a switching means operative as a rectifier in accordance with one-half frequency cycles of said voltage measurement signals to always select the same voltage measurement signal polarity for coupling to the input of the analog-to-digital converter.

5. The protective relay in accordance with claim 1 wherein the interrupt generating means includes means for monitoring the voltage measurement signal and generating interrupt signals at frequency half-cycles thereof.

6. The protective relay in accordance with claim 1 wherein the interrupt generating means includes a zero-crossing detector for monitoring the voltage measurement signal and generating interrupt signals at zero crossing thereof.

7. The protective relay in accordance with claim 1 wherein the setting means includes means for setting the overexcitation protection type (MVH) and means for setting a K factor associated therewith; and wherein the programmed processor is operative to select, at the other times, the derivation constants 1/C and L from the memory means based on the read MVH and K factor settings correspondingly associated with the other times.

8. The protective relay in accordance with claim 1 including an automatic restart circuit for detecting a malfunction in the operation of the programmed processor and for restarting said operation at a predetermined operational point.

9. The protective relay in accordance with claim 8 including a power supply for supplying electrical energy to said relay at at least one voltage level; and means for detecting an undervoltage condition of said power supply and for generating an undervoltage signal indicative thereof; and wherein the automatic restart circuit includes means generated by said undervoltge signal to suspend processor operation during the generation of said undervoltage signal and to restart the processor operation at the predetermined operational point upon alleviation of said generation.

10. A programmed protective relay for protecting power equipment, supplied with energy from a three phase power system including three power lines, against overexcitation by deriving an overexcitation time-to-trip based on a selectable relationship of the ratio of voltage frequency of at least one of three energy supplying power lines, said protective relay comprising:

a programmed digital signal processor;

memory means, coupled to said programmed processor, for storing a plurality of digitally coded signals representative of predetermined derivation constants;

means for setting a plurality of derivation parameters;

means for measuring the voltages of three energy supplying power lines and for generating first, second and third signals respectively representative of said voltages;

means governed by said programmed processor to sample said first, second and third voltage measurement signals at corresponding first predetermined times and to digitize said sampled first, second and third voltage measurement signals, a frequency cycle of each power line voltage including a plurality of first predetermined times;

first, second and third means respectively corresponding to said first, second and third voltage measurement signals for generating first, second and third interrupts to said programmed processor based on the frequency cycles of their corresponding first, second and third voltage measurement signals;

said programmed processor responsive to said generated first, second and third interrupts to derive first, second and third digital signals respectively corresponding thereto, each digital signal derived from its sampled voltage measurement signals digitized over the corresponding inter-interrupt period and representative of the voltage/frequency ratio of its voltge measurement signal for the corresponding inter-interrupt period;

said programmed processor operative over predetermined time intervals each including a plurality of inter-interrupt periods, to derive for each predetermined time interval fourth, fifth and sixth digital signals, each representative of an overall voltage/frequency ratio value $X_1$, from its respective first, second and third digital signals derived over the corresponding predetermined time interval i;

said programmed processor operative at times corresponding to said predetermined time intervals to read said parameter settings;

said programmed processor operative to select, at other times, certain of said digitally coded derivation constants from said memory means corresponding to said read parameter settings associated with said other times;

said programmed processor operative to detect an overexcitation condition from said derived fourth, fifth and sixth digital signals;

said programmed processor operative, in response to the detection of an overexcitation condition, to derive an overexcitation time-to-trip based on the following relationship:

$$\sum_{i=1}^{N} \exp\left[\frac{1}{C}(X_i - 1)\right] \geq L,$$

where i from 1 to N represent the predetermined time intervals during which said overexcitation condition exits;

where 1/C and L represent digitally coded derivation constants based on said read parameter settings for said corresponding predetermined time interval i;

where N represents the number of predetermined time intervals which may elapse for the time-to-trip beyond a minimum number of predetermined time intervals for the time-to-trip;

where $X_i$ represents the detected overexcitation digital ratio value signal derived for the corresponding predetermined time interval i; and means for governing the interruption of energy to said power equipment if said overexcitation condition persists for the duration of said time-to-trip derivation.

11. The protective relay in accordance with claim 10, wherein the measuring means includes first, second and third measuring means correspondingly associated with each power line for generating respectively the first, second and third voltage measurement signals, each in the form of two voltage measurement signals substantially 180° apart; including first, second and third switching means coupled respectively to said first, second and third measuring means, each switching means operative as a rectifier in accordance with the frequency half-cycles of its corresponding voltage measurement signals 180° apart to switch therebetween to always select the same signal polarity thereof, said first, second and third switching means having a common output and further operative to select one of the first, second and third rectified voltage measurement signals to pass to the common output thereof as governed by a digitally coded selection signal generated by the programmed processor; and wherein the sampling and digitizing means includes an analog-to-digital converter operatively governed by the programmed processor to digitize said selected voltage measurement signals, said converter having a limited input signal range for which to provide a corresponding digitally-coded signal; and a ranging circuit coupled between said common output of said switching means and analog-to-digital converter for scaling the selected voltage measurement signal to within the input signal range of said analog-to-digital converter as governed by a digitally coded range signal generated by the programmed processor.

12. The protective relay in accordance with claim 11 wherein the ranging circuit includes a plurality of range settings selectable for scaling the selected voltage measurement signal, and means for detecting when said scaled signal is beyond the input signal range of the analog-to-digital converter and for generating an over-range signal indicative thereof; and wherein the programmed processor is operative to monitor said over-range signal and to select a range setting by governing the range signal codes to sequence through said plurality of range settings from the highest to the lowest based on said monitored over-range signal.

13. The protective relay in accordance with claim 10 wherein the setting means includes means for setting an overexcitation protection type (MVH) and means for setting a K factor associated therewith; and wherein the programmed processor is operative to select, at the other times, the derivation constants 1/C and L from the memory means based on the read MVH at K factor settings.

14. Method of protecting power equipment, supplied with energy from at least one power line, against overexcitation by deriving a time-to-trip based on a selectable relationship of the ratio of voltage/frequency of said power line, said method comprising the steps of:

(a) storing a plurality of digitally coded signals representative of predetermined derivation constants in a memory of a digital signal processing system;

(b) setting a plurality of derivation parameters;

(c) measuring the voltage of said power line and generating at least one signal representative thereof;

(d) sampling and digitizing said voltage measurement signal at first predetermined times as governed by a programmed digital signal processor of said processing system, a frequency cycle of the power line voltage including a plurality of first predetermined times;

(e) generating interrupts to said programmed processor based on the voltage frequency cycles of said power line;

(f) operating said programmed processor in response to said generated interrupts to derive first digital signals, representative of the voltage/frequency ratio of said power line, corresponding to each interrupt, from the sampled voltage measurement signals digitized over the corresponding inter-interrupt periods;

(g) operating said programmed processor over predetermined time intervals each including a plurality of inter-interrupt periods, to derive for each predetermined time interval a second digital signal, representative of an overall voltage/frequency ratio value $X_i$, from the first digital signals derived over the corresponding predetermined time interval i;

(h) operating said programmed processor at times corresponding to said predetermined time intervals to read said parameter settings;

(i) operating said programmed processor to select, at other times, certain of said digitally coded derivation constants from said memory means corresponding to said read parameter settings associated with said other times;

(j) operating said programmed processor to detect an overexcitation condition from said derived second digital signals;

(k) operating said programmed processor in response to the detection of an overexcitation condition to derive an overexcitation time-to-trip by:

(1) accumulating quantities expressed as $\text{EXP}[1/C(X_i - 1)]$, for each predetermined time interval i during the time that the overexcitation condition persists, until the value of said accumulated quantities becomes greater than or equal to L, and (2) delaying for a fixed number of additional predetermined time intervals for which said overcurrent condition persists, where 1/C and L represent derivation constants based on said read parameter settings for each corresponding predetermined time interval i; and (m) governing the interruption of energy to said power equipment if said overexcitation condition persists for the duration of said time-to-trip derivation.

15. The method in accordance with claim 14 wherein the step (e) includes monitoring the voltage measurement signal and generating interrupt signals at zero-crossing half-cycles thereof; wherein step (f) includes operating the programmed processor in response to said half-cycle interrupts to derive the first digital signals by integrating the sampled voltage measurement signals digitized over the corresponding inter-interrupt periods; and wherein step (g) includes operating the programmed processor to derive each second digital signal by averaging the first digital signals derived over the corresponding predetermined time interval.

16. The method in accordance with claim 14 wherein the step (b) includes setting a voltage pick-up value, a frequency value and a pick-up adjustment value; wherein the step (i) includes operating the programmed processor to select, at other times, a pick-up ratio value from said memory means corresponding to the read voltage pick-up and frequency value settings associated with the other times; including the step of operating the program processor, at the other times, to adjust the corresponding selected pick-up ratio value by the read pick-up adjustment value setting associated with the other times; and wherein the step (j) includes operating the programmed processor to detect an overexcitation condition by determining when the derived second signal is greater than the corresponding adjusted pick-up ratio value.

17. The method in accordance with claim 14 including the step of operating the programmed processor under non-overexcitation conditions to decrement the value of the accumulated quantity $$EXP[1/C(X_i-1)]$$

corresponding to step (k) with a constant value at each predetermined time interval until one of a plurality of events occur, said plurality including the value of said accumulated quantity reaching zero and an overexcitation condition arises.

* * * * *